US011849261B1

(12) United States Patent
Shi

(10) Patent No.: US 11,849,261 B1
(45) Date of Patent: Dec. 19, 2023

(54) RECREATIONAL VEHICLE MONITORING DEVICE

(71) Applicant: Huifang Shi, Guangdong (CN)

(72) Inventor: Huifang Shi, Guangdong (CN)

( * ) Notice: Subject to any disclaimer, the term of this patent is extended or adjusted under 35 U.S.C. 154(b) by 0 days.

(21) Appl. No.: 18/363,620

(22) Filed: Aug. 1, 2023

(51) Int. Cl.
*H04N 7/18* (2006.01)
*H01R 31/02* (2006.01)
*B60R 16/03* (2006.01)
*B60R 11/04* (2006.01)

(52) U.S. Cl.
CPC ............. *H04N 7/183* (2013.01); *B60R 11/04* (2013.01); *B60R 16/03* (2013.01); *H01R 31/02* (2013.01); *H01R 2201/26* (2013.01)

(58) Field of Classification Search
CPC .... H04N 7/183; H01R 31/02; H01R 2201/26; B60R 11/04; B60R 16/03
See application file for complete search history.

(56) References Cited

U.S. PATENT DOCUMENTS

| | | | | |
|---|---|---|---|---|
| 2004/0119820 A1* | 6/2004 | Nagao | ...................... | H04N 7/18 340/310.11 |
| 2015/0210215 A1* | 7/2015 | Chuang | .................. | H04N 7/183 348/148 |

* cited by examiner

*Primary Examiner* — Kathleen V Nguyen

(57) ABSTRACT

The present disclosure discloses a recreational vehicle monitoring device, which includes a camera, a connecting cable, a signal transmitting device and a display device. The camera is configured to be arranged at a rear portion of a carriage of the recreational vehicle and generate a video signal. A first end of the connecting cable is connected to the camera, and the connecting cable is configured to transmit the video signal and electric energy. The signal transmitting device is connected to a second end of the connecting cable, and the signal transmitting device is configured to receive the video signal, convert the video signal into a radio signal, and transmit the radio signal. The display device is configured to receive the radio signal, convert the radio signal into the video signal, and play a video.

13 Claims, 7 Drawing Sheets

RECREATIONAL VEHICLE MONITORING DEVICE

TECHNICAL FIELD

The present invention relates to the technical field of recreational vehicle monitoring, and in particular to, a recreational vehicle monitoring device.

BACKGROUND

A large recreational vehicle, as a mobile vehicle with household essential basic facilities, is popular in daily lives, especially for those who like to travel. The various household essential infrastructures can solve many problems and are convenient to use.

However, this type of vehicle usually has a large carriage, making it difficult to observe the rear of the vehicle during driving and parking. In general, people usually arrange a rear camera to monitor the rear of the vehicle and conditions around the rear during reversing in real time, and signals are transmitted to a display device in a cab through a wireless transmitter mounted in the front of the carriage. However, due to the fact that the carriage of the recreational vehicle is too long, an extremely high wire resistance between the camera and the signal transmitter causes a failure of stably providing power or transmitting signals. As a result, users cannot timely learn about the condition of the rear of the vehicle through the camera, resulting in accidents or property losses.

Therefore, the present disclosure provides a recreational vehicle monitoring device that can effectively solve the above problems. The recreational vehicle monitoring device has a simple structure and stable signal transmission.

SUMMARY

In order to overcome the shortcomings of the prior art, the present disclosure provides a recreational vehicle monitoring device, which has a simple structure and stable signal transmission.

The technical solution adopted by the present disclosure to solve the technical problem is as follows: a recreational vehicle monitoring device including a camera, wherein the camera is configured to be arranged at a rear portion of a carriage of the recreational vehicle and generate a video signal; a connecting cable, wherein a first end of the connecting cable is connected to the camera, and the connecting cable is configured to transmit the video signal and electric energy; a signal transmitting device, wherein the signal transmitting device is connected to a second end of the connecting cable, and the signal transmitting device is configured to receive the video signal, convert the video signal into a radio signal, and transmit the radio signal; and a display device, wherein the display device is configured to receive the radio signal, convert the radio signal into the video signal, and play and/or store a video; wherein the connecting cable includes a first signal cable and a first conducting cable; the first signal cable is configured to transmit the video signal; and the first conducting cable is configured to supply power to the camera and the signal transmitting device.

As the improvement of the present disclosure, the recreational vehicle monitoring device further includes an adapter cable, wherein a first adapter is arranged at a first end of the adapter cable; a second adapter is arranged at a second end of the adapter cable; a power connector is further arranged in the middle of the adapter cable; the power connector is configured to be connected to a power supplying end; the connecting cable includes a first cable, a second cable, and a third cable; a first end of the first cable is connected to the camera; a third adapter is arranged at a second end of the first cable; a first end of the second cable is connected to the signal transmitting device; a fourth adapter is arranged at a second end of the second cable; a fifth adapter is arranged at one end of the third cable, and a sixth adapter is arranged at the other end of the third cable; wherein the first adapter is detachably connected to the third adapter; the fourth adapter is detachably connected to the fifth adapter; and the sixth adapter is detachably connected to the second adapter; or, the first adapter is detachably connected to the fifth adapter; the sixth adapter is detachably connected to the third adapter; and the fourth adapter is detachably connected to the second adapter.

As the improvement of the present disclosure, the adapter cable includes a second signal cable, a second conducting cable, and a third conducting cable; the second signal cable is connected to the first signal cable; the second conducting cable is connected to the first conducting cable; one end of the third conducting cable is connected to the second conducting cable; and the other end of the third conducting cable is connected to the power connector.

As the improvement of the present disclosure, the recreational vehicle monitoring device further includes a booster device, wherein the booster device is arranged on the adapter cable, is connected to the second conducting cable and the third conducting cable, and is configured to increase a voltage on the second conducting cable.

As the improvement of the present disclosure, the first adapter, the fourth adapter, and the sixth adapter are male connectors, while the second adapter, the third adapter, and the fifth adapter are female connectors; or, the first adapter, the fourth adapter, and the sixth adapter are female connectors, while the second adapter, the third adapter, and the fifth adapter are male connectors.

As the improvement of the present disclosure, the signal transmitting device includes a transmitting main body and a transmitting antenna; and the transmitting antenna is rotatably connected to the transmitting main body.

As the improvement of the present disclosure, a matching switch is further arranged on a side surface of the transmitting main body; and the matching switch is configured to allow the signal transmitting device to be matched and connected with the display device.

As the improvement of the present disclosure, connecting pieces are arranged on two sides of the transmitting main body, and the connecting pieces are configured to be connected to a top of the carriage of the recreational vehicle.

As the improvement of the present disclosure, an indicator lamp is arranged on an upper surface of the transmitting main body to indicate a working status of the transmitting main body.

As the improvement of the present disclosure, the recreational vehicle monitoring device further includes a camera holder, wherein a connecting end of the camera holder is configured to be connected to the rear portion of the carriage of the recreational vehicle; and the camera is rotatably connected to the camera holder to change a direction of the camera.

As the improvement of the present disclosure, the camera holder is further provided with a through hole, and the through hole is configured to allow the first cable to pass.

As the improvement of the present disclosure, a plurality of fill lights are arranged on a surface of the camera that is provided with a lens, and the fill lights surround the lens of the camera.

As the improvement of the present disclosure, the display device includes a display screen main body and a receiving antenna, and the receiving antenna is rotatably connected to the display screen main body.

As the improvement of the present disclosure, the recreational vehicle monitoring device further includes a display support, wherein the display support includes a base and a support member; and one end of the support member is connected to the display device, and the other end of the support member is rotatably connected to the base.

Beneficial effects: due to the arrangement of the above structure, during use, the camera is mounted at the rear portion of the recreational vehicle and can capture images of a surrounding area of the rear portion of the recreational vehicle and transmit the video signal along the first signal cable to the signal transmitting device. The signal transmitting device converts the video signal into the radio signal and transmits the radio signal. The display device receives the radio signal, converts the radio signal into the video signal, and plays the video, so that a user can timely obtain environmental conditions of the rear portion of the recreational vehicle. Moreover, the first conducting cable is used to transmit the electrical energy, which can guarantee power supplying independently and prevent signal transmission interruption caused by voltage instability, and can also reduce interference between the first signal cable and the first conducting cable and ensure the stability of the video signal transmitted within the first signal cable, so as to further facilitate the user to obtain the environmental conditions of the rear portion of the recreational vehicle.

BRIEF DESCRIPTION OF THE DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
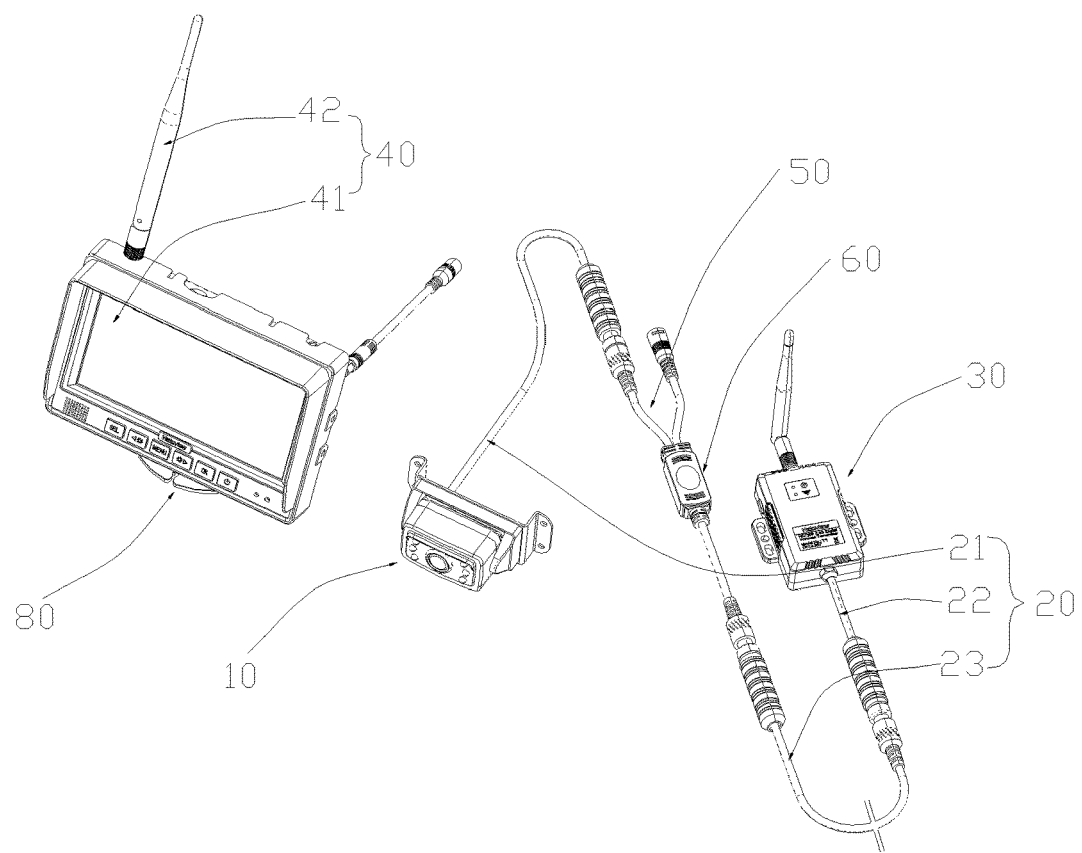
FIG. 1 is a schematic diagram of an entire structure in one angle of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the application, "a plurality of" means two or more, unless otherwise specifically defined.

Figure 2:
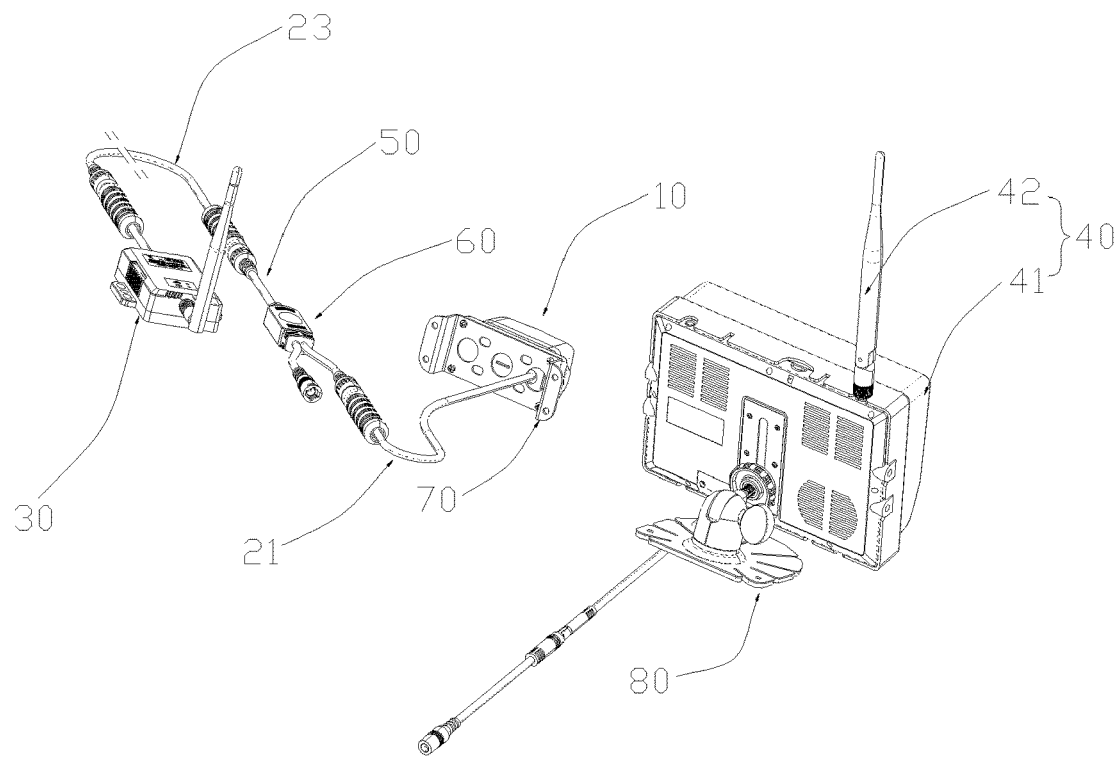
FIG. 2 is a schematic diagram of an entire structure in another angle of the present disclosure.

Referring to FIG. 1 and FIG. 2, a recreational vehicle monitoring device includes a camera 10, a connecting cable 20, a signal transmitting device 30 and a display device 40.

Figure 8:
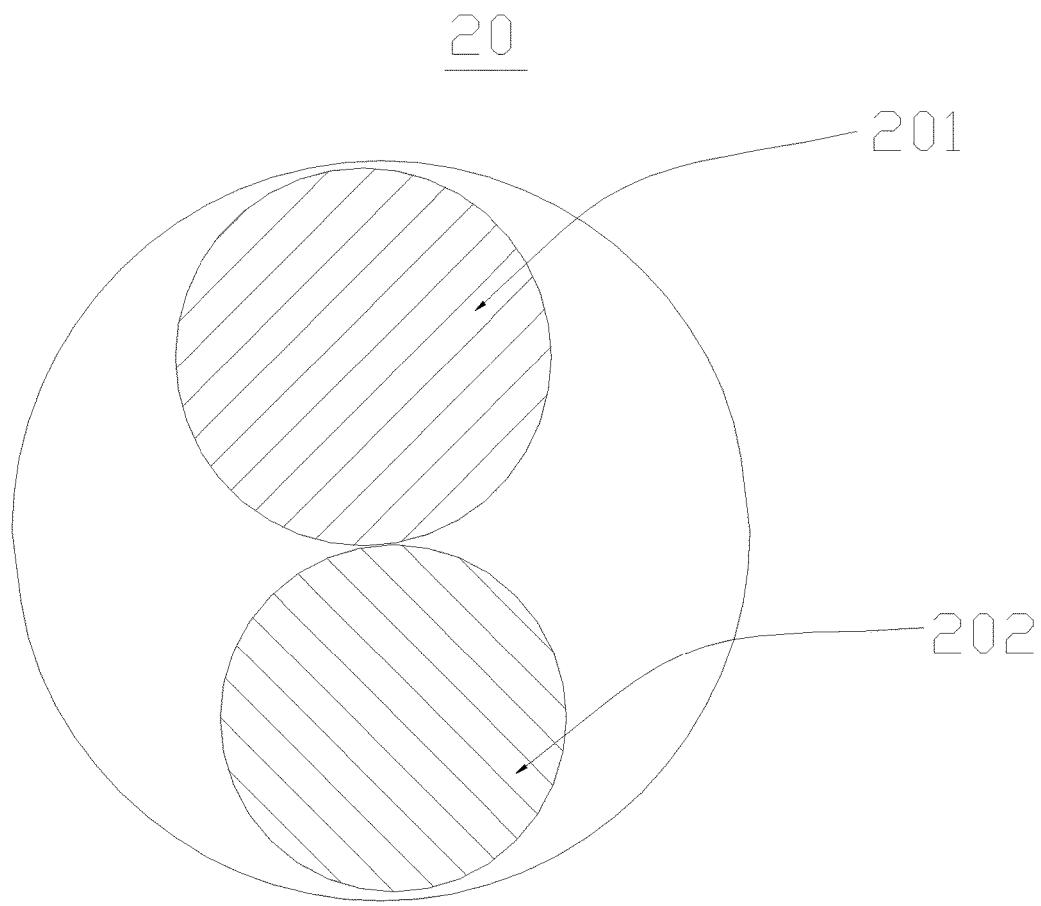
FIG. 8 is a sectional view of a connecting cable of the present disclosure.

The camera 10 is configured to be arranged at a rear portion of a carriage of the recreational vehicle and generate a video signal. A first end of the connecting cable 20 is connected to the camera 10, and the connecting cable 20 is configured to transmit the video signal and electric energy. The signal transmitting device 30 is connected to a second end of the connecting cable 20, and the signal transmitting device 30 is configured to receive the video signal, convert the video signal into a radio signal, and transmit the radio signal. The display device 40 is configured to receive the radio signal, convert the radio signal into the video signal, and play and/or store a video. The connecting cable 20 includes a first signal cable 201 and a first conducting cable 202. As shown in FIG. 8, the first signal cable 201 is configured to transmit the video signal; and the first conducting cable 202 is configured to supply power to the camera 10 and the signal transmitting device 30.

Due to the arrangement of the above structure, during use, the camera is mounted at the rear portion of the recreational vehicle and can capture images of a surrounding area of the rear portion of the recreational vehicle and transmit the video signal along the first signal cable to the signal transmitting device. The signal transmitting device converts the video signal into the radio signal and transmits the radio signal. The display device receives the radio signal, converts the radio signal into the video signal, and plays the video, so that a user can timely obtain environmental conditions of the rear portion of the recreational vehicle. Moreover, the first conducting cable is used to transmit the electrical energy, which can guarantee power supplying independently and prevent signal transmission interruption caused by voltage instability, and can also reduce interference between the first signal cable and the first conducting cable and ensure the stability of the video signal transmitted within the first signal cable, so as to further facilitate the user to obtain the environmental conditions of the rear portion of the recreational vehicle. The first conducting cable includes a positive electrode wire and a negative electrode wire. The positive electrode wire and the negative electrode wire can achieve circuit connectivity and effectively power the camera and signal transmitting device. The first signal cable includes a video wire, an audio wire, and an image wire, which can stably transmit sound and image information. Preferably, a shielding wire is also arranged between the first conducting cable and the first signal cable, which can prevent the first conducting cable from interfering with the information transmission inside the first signal cable and ensure stable transmission of the sound and image information.

In this embodiment, the recreational vehicle monitoring device further includes an adapter cable 50. As shown in FIG. 5, a first adapter 51 is arranged at a first end of the adapter cable 50; a second adapter 52 is arranged at a second end of the adapter cable 50; a power connector 53 is further arranged in the middle of the adapter cable 50; the power connector 53 is configured to be connected to a power supplying end; and the connecting cable 20 includes a first cable 21, a second cable 22, and a third cable 23. As shown in FIG. 3 to FIG. 4 and FIG. 6 to FIG. 7, a first end of the first cable 21 is connected to the camera 10; a third adapter 24 is arranged at a second end of the first cable 21; a first end of the second cable 22 is connected to the signal transmitting device 30; a fourth adapter 25 is arranged at a second end of the second cable 22; a fifth adapter 26 is arranged at one end of the third cable 23; and a sixth adapter 27 is arranged at the other end of the third cable 23.

The first adapter 51 is detachably connected to the third adapter 24; the fourth adapter 25 is detachably connected to the fifth adapter 26; and the sixth adapter 27 is detachably connected to the second adapter 52.

Or, the first adapter 51 is detachably connected to the fifth adapter 26; the sixth adapter 27 is detachably connected to the third adapter 24; and the fourth adapter 25 is detachably connected to the second adapter 52.

Due to the arrangement of the above structure, the first cable, the third cable, the adapter cable, and the second cable are connected in sequence, which can transmit the video signal and the electrical energy between the first cable and the second cable. The connecting cable can be indirectly extended, so that the recreational vehicle monitoring device can adapt to longer recreational vehicles. The video signal generated by the camera is transmitted to the signal transmitting device through the first cable, the adapter cable, the third cable, and the second cable, or the video signal generated by the camera is transmitted to the signal transmitting device through the first cable, the third cable, the adapter cable, and the second cable, which achieves effective signal transmission. The adapter cable is also provided with the power connector that can be connected to an external power source to effectively supply power to the camera and the signal transmitting device, prevent voltage drops in the first cable, the second cable, the third cable, and the adapter cable, ensure continuous and stable operations of the camera and the signal transmitting device, and improve the stability of the product. Moreover, the first adapter and the third adapter are detachably connected, while the second adapter and the fourth adapter are detachably connected, which can facilitate a user to mount the camera, the signal transmitting device, the adapter cable, and the like, and make assembling convenient. The positions of the adapter cable and the third cable can be interchanged, making it convenient for the user to adjust a connecting position of the adapter cable to make the adapter cable closer to the external power source, reducing the electrical energy loss caused by impedance on the adapter cable, and ensuring the stability of the voltages in the first cable, the third cable, the adapter cable, and the second cable.

Figure 9:
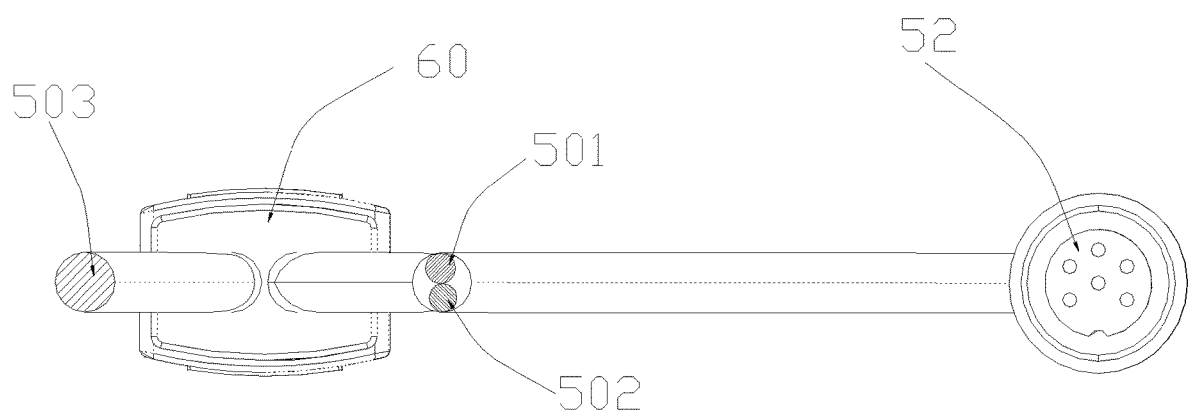
FIG. 9 is a sectional view of an adapter cable of the present disclosure.

In this embodiment, as shown in FIG. 9, the adapter cable 50 includes a second signal cable 501, a second conducting cable 502, and a third conducting cable 503; the second signal cable 501 is connected to the first signal cable 201; the second conducting cable 502 is connected to the first conducting cable 202; one end of the third conducting cable 503 is connected to the second conducting cable 502; and the other end of the third conducting cable 503 is connected to the power connector 53. Due to the arrangement of the above structure, the second signal cable is connected to the first signal cable to achieve stable transmission of the video signal, while the second conducting cable is connected to the first conducting cable to achieve power transmission between the camera and the signal transmitting device. One end of the third conducting cable is connected to the second conducting cable, and the other end of the third conducting cable is connected to the power connector, which can achieve connection to the external power source and provide electrical energy for the camera and the signal transmitting device, so that the camera and the signal transmitting device can continuously and stably work to and ensure the stability of endurance of the product. The second conducting cable and the third conducting cable include positive electrode wires and negative electrode wires. The positive electrode wires and the negative electrode wires can achieve circuit connectivity and can effectively supply power to the camera and signal transmitting device. The second signal cable includes a video wire, an audio wire, and an image wire, which can stably transmit sound and image information. Preferably, a shielding wire is further arranged between the second conducting cable and the second signal cable, which can prevent the second conducting cable from interfering with the information transmission in the second signal cable and ensure stable transmission of the sound and image information.

In this embodiment, as shown in FIG. 5, the recreational vehicle monitoring device further includes a booster device 60. The booster device 60 is arranged on the adapter cable 50. The booster device 60 is connected to the second conducting cable 502 and the third conducting cable 503. The booster device 60 is configured to increase a voltage on the second conducting cable 502. Due to the arrangement of the above structure, during use, the booster device is arranged on the adapter cable and can increase the voltage on the second conducting cable, so as to eliminate the influence of the wire resistance. A length of the connecting cable and a length of the adapter cable can be randomly increased, so that the product adapts to recreational vehicles with different carriage lengths, and a current is constantly stable.

In this embodiment, the first adapter 51, the fourth adapter 25, and the sixth adapter 27 are male connectors, while the second adapter 52, the third adapter 24, and the fifth adapter 26 are female connectors; or, the first adapter 51, the fourth adapter 25, and the sixth adapter 27 are female connectors, while the second adapter 52, the third adapter 24, and the fifth adapter 26 are male connectors. Due to the arrangement of the above structure, during use, a user can connect the male connectors to the female connectors, so that the connecting cable and the adapter cable are connected more conveniently and stably, and the user only needs to distinguish the male connectors from the female connectors to achieve quick connection and avoid wiring errors.

Figure 7:
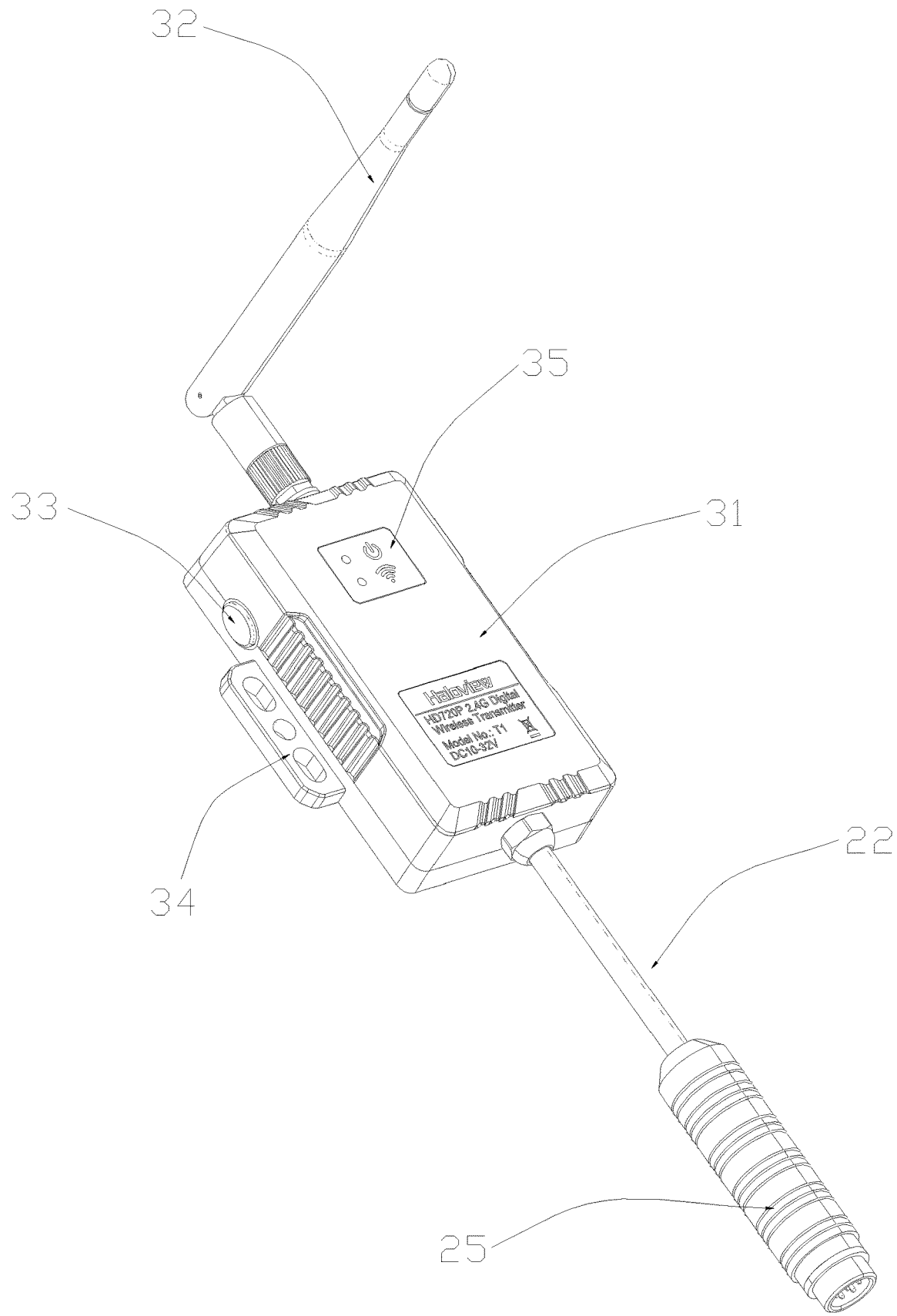
FIG. 7 is a schematic structural diagram of a signal transmitting device of the present disclosure.

In this embodiment, as shown in FIG. 7, the signal transmitting device 30 includes a transmitting main body 31 and a transmitting antenna 32; and the transmitting antenna 32 is rotatably connected to the transmitting main body 31. Due to the arrangement of the above structure, during use, a user can adjust a direction of the transmitting antenna according to a mounting position of the signal transmitting device, so that the radio signal can be transmitted towards the position where the display device is located, so that the display device can stably receive the radio signal. It allows the user to clearly observe images captured by the camera on the display device, making it convenient for the user to learn about the environmental conditions of the rear portion of the recreational vehicle.

In this embodiment, as shown in FIG. 7, a matching switch 33 is further arranged on a side surface of the transmitting main body 31; and the matching switch 33 is configured to allow the signal transmitting device 30 to be matched and connected with the display device 40. Due to the arrangement of the above structure, during use, a user can touch or press the matching switch to turn on or turn off the signal transmitting device, so that the signal transmitting device is matched and connected with the camera.

In this embodiment, as shown in FIG. 7, connecting pieces 34 are arranged on two sides of the transmitting main body 31, and the connecting pieces 34 are configured to be connected to a top of the carriage of the recreational vehicle. Due to the arrangement of the above structure, during use, the transmitting main body is fixedly connected to a front portion of a carriage main body of the recreational vehicle through the connecting pieces, so that the product is stably connected to the recreational vehicle, and the stability of the product and the convenience of mounting are improved.

In this embodiment, as shown in FIG. 7, an indicator lamp 35 is arranged on an upper surface of the transmitting main body 31, and the indicator lamp 35 is configured to indicate a working status of the transmitting main body 31. Due to the arrangement of the above structure, the indicator lamp includes a power indicator lamp and a signal indicator lamp. During use, when the signal transmitting device is powered on, the power indicator lamp is lightened to display an electrical connection status of the signal transmitting device. After the matching switch is pressed, the signal transmitting device searches for the camera and matches it. When there is no matching camera, the signal indicator lamp goes out. After successful pairing and matching, the signal indicator lamp flickers. When the camera is disconnected from the signal transmitting device, the signal indicator lamp remains on. Through the signal indicator lamp, a connection status between the camera and the signal transmitting device can be visually observed, facilitating use by a user.

Figure 3:
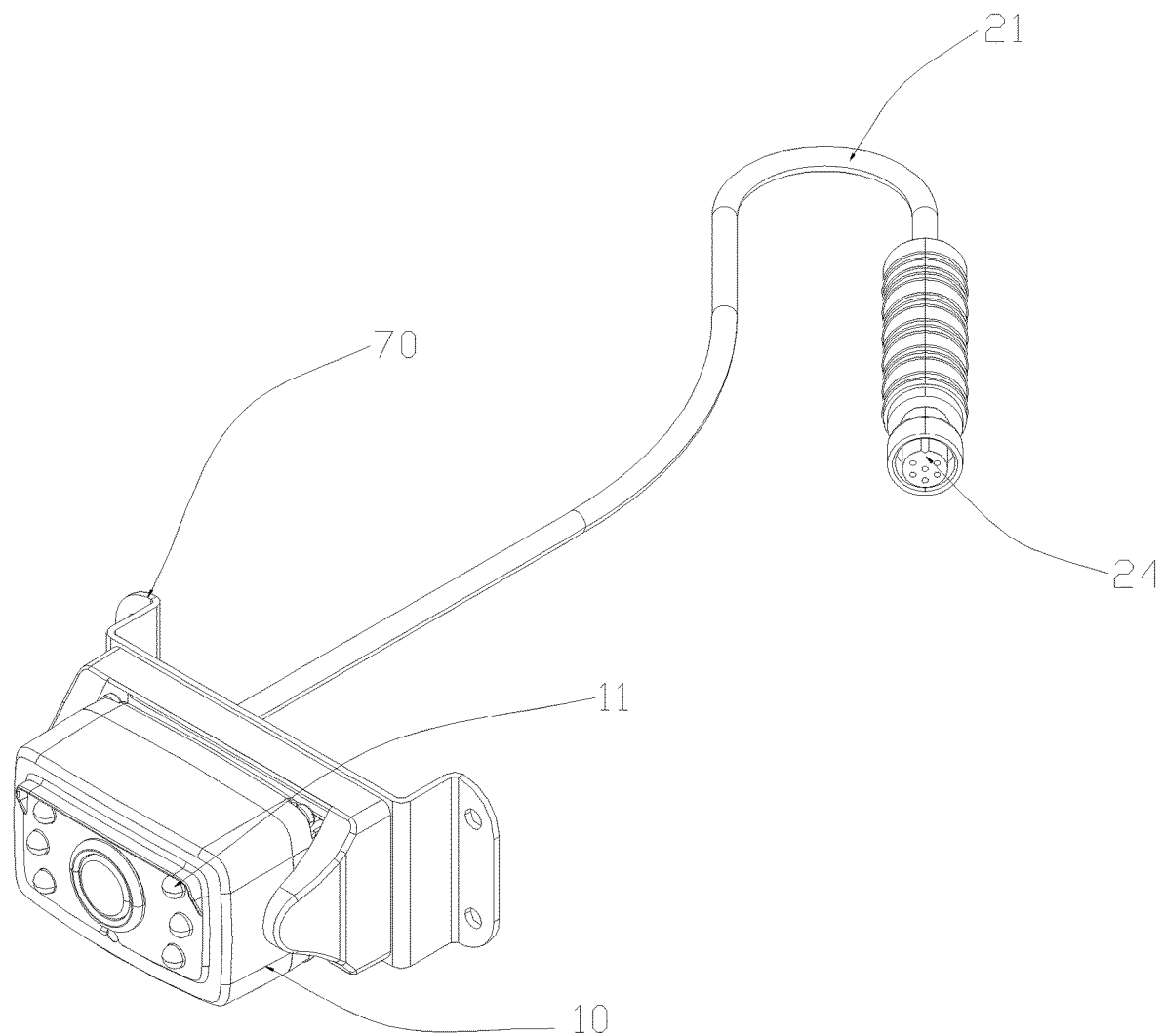
FIG. 3 is a schematic structural diagram of a camera portion of the present disclosure in one angle.
Figure 4:
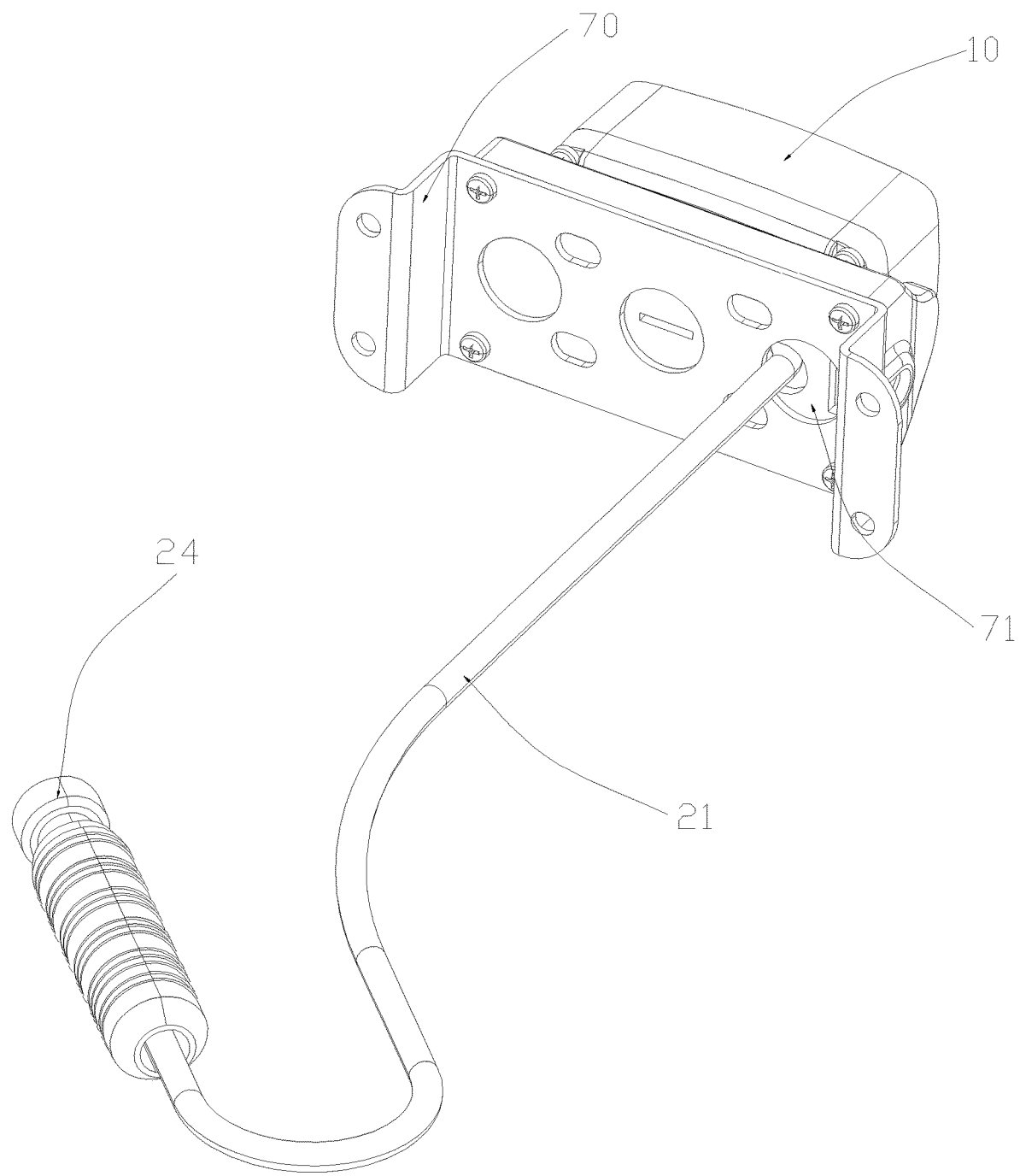
FIG. 4 is a schematic structural diagram of a camera portion of the present disclosure in another angle.
Figure 5:
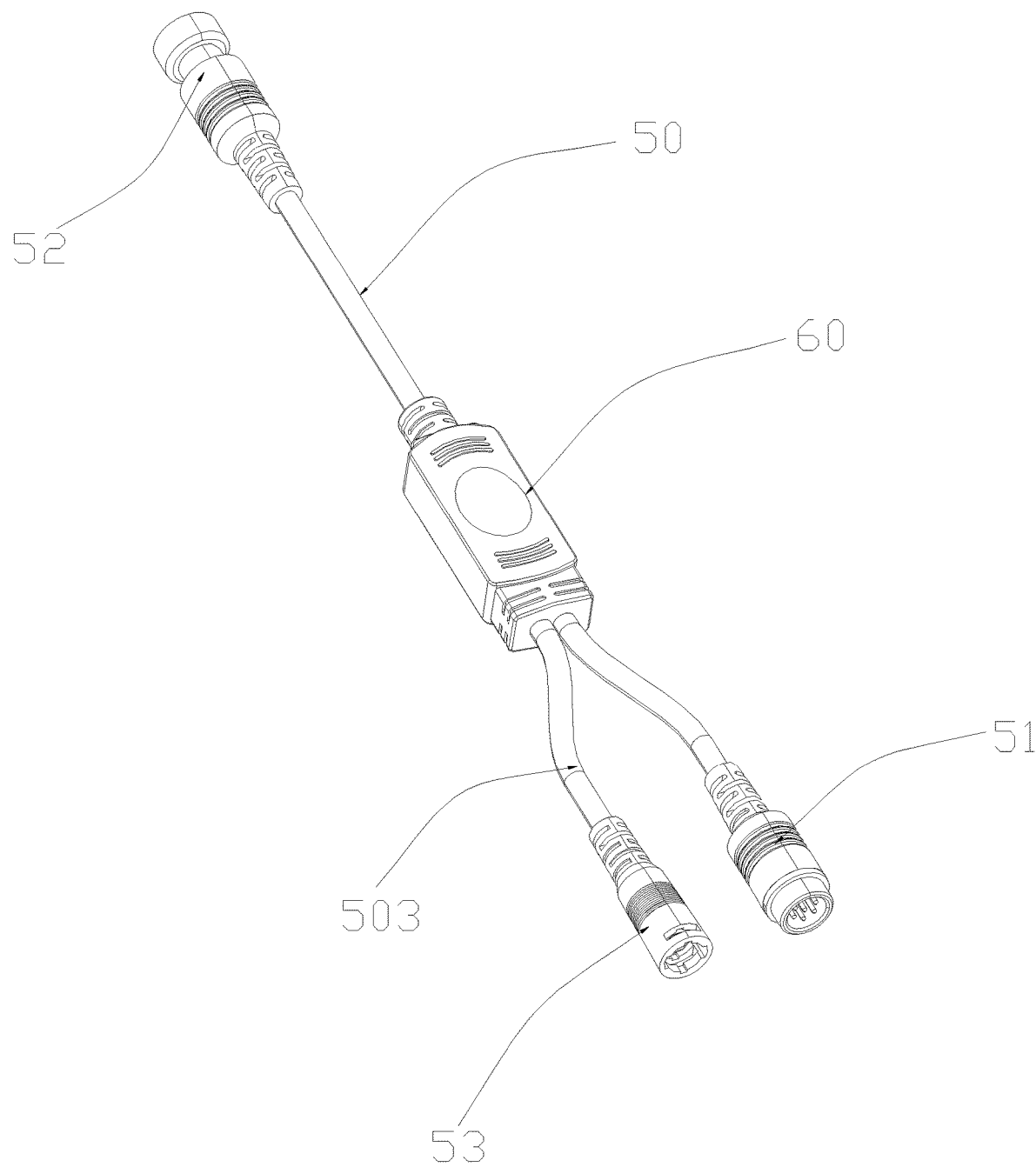
FIG. 5 is a schematic structural diagram of an adapter cable of the present disclosure.
Figure 6:
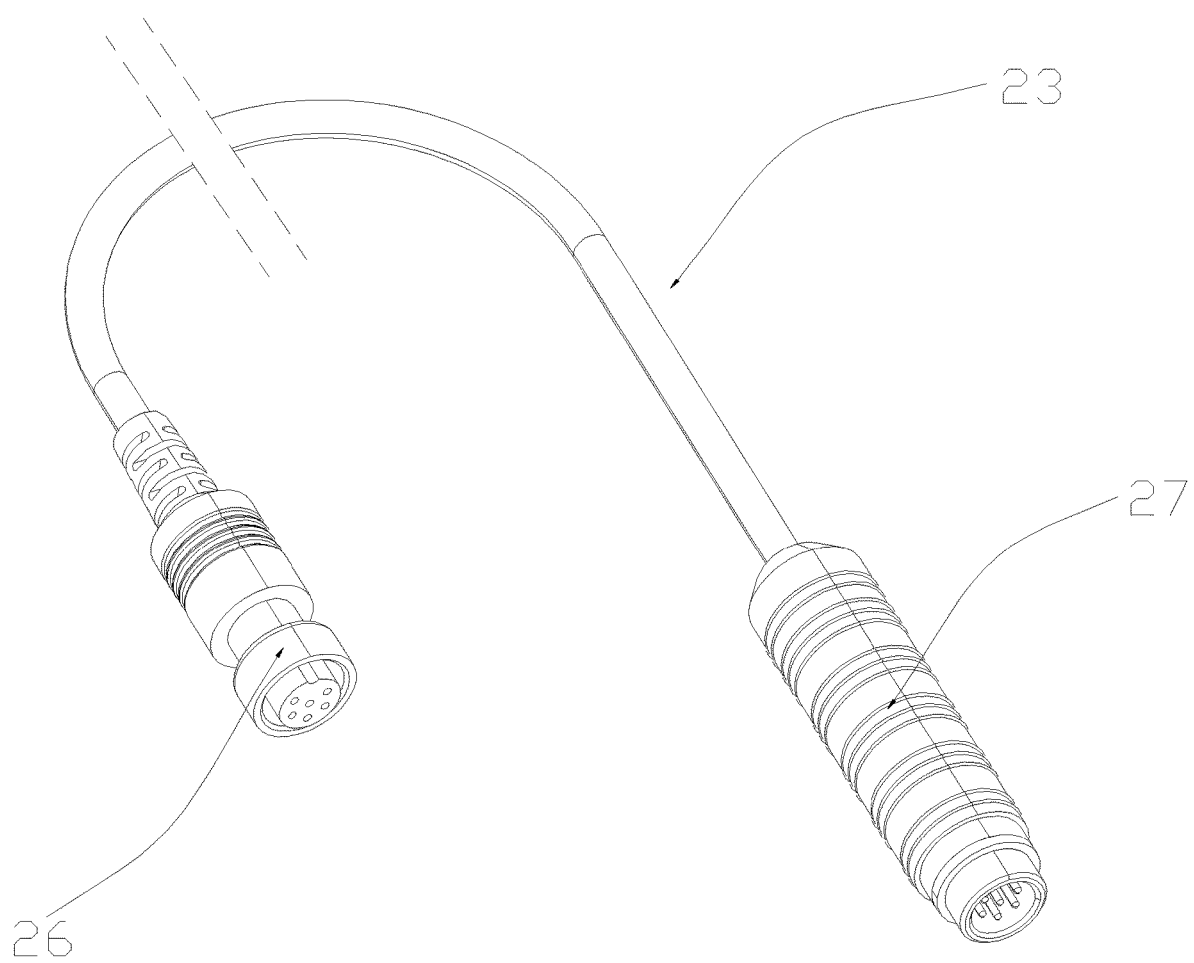
FIG. 6 is a schematic structural diagram of a third cable of the present disclosure.

In this embodiment, as shown in FIG. 3 to FIG. 4, the recreational vehicle monitoring device further includes a camera holder 70; a connecting end of the camera holder 70 is configured to be connected to the rear portion of the carriage of the recreational vehicle; and the camera 10 is rotatably connected to the camera holder 70 to change a direction of the camera 10. Due to the arrangement of the above structure, during use, the camera is connected to the camera holder and is then mounted at the rear portion of the carriage of the recreational vehicle. A user can adjust the direction of the camera, so that the user can adjust an appropriate angle by rotating the camera, to better observe the environmental conditions of the rear portion of the recreational vehicle and improve the safety of driving or parking the recreational vehicle.

In this embodiment, as shown in FIG. 4, the camera holder 70 is further provided with a through hole 71, and the through hole 71 is configured to allow the first cable 21 to pass. Due to the arrangement of the above structure, during use, the first cable passes through the through hole, so that the first cable is connected to the camera more stably. Furthermore, the camera holder can protect part of the first cable and also facilitate mounting.

In this embodiment, as shown in FIG. 3, a plurality of fill lights 11 are arranged on a surface of the camera 10 that is provided with a lens, and the fill lights 11 surround the lens of the camera 10. Due to the arrangement of the above structure, during use, the fill lights are mounted on the surface with the lens. The fill lights can be turned on when ambient light is insufficient, so as to supplement light, so that the camera can better monitor the conditions of the rear portion of the recreational vehicle and obtain clear images, thereby improving the safety of driving or parking the recreational vehicle.

In this embodiment, as shown in FIG. 1 to FIG. 2, the display device 40 includes a display screen main body 41 and a receiving antenna 42, and the receiving antenna 42 is rotatably connected to the display screen main body 41. Due to the arrangement of the above structure, during use, a user can rotate the receiving antenna and adjust a direction of the receiving antenna, so as to receive signal transmitted by the signal transmitting device more stably, thereby better observing the environment at the rear portion of the carriage of the recreational vehicle.

In this embodiment, as shown in FIG. 1 to FIG. 2, the recreational vehicle monitoring device further includes a display support 80; the display support 80 includes a base 81 and a support member 82; and one end of the support member 82 is connected to the display device 40, and the other end of the support member 82 is rotatably connected to the base 81. Due to the arrangement of the above structure, during use, the base of the display support is connected to a cab of the recreational vehicle, and the display device is connected to the support member. The support member is rotated to adjust the display device to face a user, making it more convenient for the user to observe video images on the display device.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:
1. A recreational vehicle monitoring device, comprising:
a camera, wherein the camera is configured to be arranged at a rear portion of a carriage of the recreational vehicle and generate a video signal;

a connecting cable, wherein a first end of the connecting cable is connected to the camera, and the connecting cable is configured to transmit the video signal and electric energy;

a signal transmitting device, wherein the signal transmitting device is connected to a second end of the connecting cable, and the signal transmitting device is configured to receive the video signal, convert the video signal into a radio signal, and transmit the radio signal; and a display device, wherein the display device is configured to receive the radio signal, convert the radio signal into the video signal, and play and/or store a video;

wherein the connecting cable comprises a first signal cable and a first conducting cable; the first signal cable is configured to transmit the video signal; and the first conducting cable is configured to supply power to the camera and the signal transmitting device;

an adapter cable, wherein a first adapter is arranged at a first end of the adapter cable; a second adapter is arranged at a second end of the adapter cable; a power connector is further arranged in the middle of the adapter cable; the power connector is configured to be connected to a power supplying end; the connecting cable comprises a first cable, a second cable, and a third cable; a first end of the first cable is connected to the camera; a third adapter is arranged at a second end of the first cable; a first end of the second cable is connected to the signal transmitting device; a fourth adapter is arranged at a second end of the second cable; a fifth adapter is arranged at one end of the third cable, and a sixth adapter is arranged at the other end of the third cable;

wherein the first adapter is detachably connected to the third adapter; the fourth adapter is detachably connected to the fifth adapter; and the sixth adapter is detachably connected to the second adapter;

or, the first adapter is detachably connected to the fifth adapter; the sixth adapter is detachably connected to the third adapter; and the fourth adapter is detachably connected to the second adapter.

2. The recreational vehicle monitoring device according to claim 1, wherein the adapter cable comprises a second signal cable, a second conducting cable, and a third conducting cable; the second signal cable is connected to the first signal cable; the second conducting cable is connected to the first conducting cable; one end of the third conducting cable is connected to the second conducting cable; and the other end of the third conducting cable is connected to the power connector.

3. The recreational vehicle monitoring device according to claim 2, further comprising a booster device, wherein the booster device is arranged on the adapter cable, is connected to the second conducting cable and the third conducting cable, and is configured to increase a voltage on the second conducting cable.

4. The recreational vehicle monitoring device according to claim 1, wherein the first adapter, the fourth adapter, and the sixth adapter are male connectors, while the second adapter, the third adapter, and the fifth adapter are female connectors; or, the first adapter, the fourth adapter, and the sixth adapter are female connectors, while the second adapter, the third adapter, and the fifth adapter are male connectors.

5. The recreational vehicle monitoring device according to claim 1, wherein the signal transmitting device comprises a transmitting main body and a transmitting antenna; and the transmitting antenna is rotatably connected to the transmitting main body.

6. The recreational vehicle monitoring device according to claim 5, wherein a matching switch is further arranged on a side surface of the transmitting main body; and the matching switch is configured to allow the signal transmitting device to be matched and connected with the display device.

7. The recreational vehicle monitoring device according to claim 5, wherein connecting pieces are arranged on two sides of the transmitting main body, and the connecting pieces are configured to be connected to a top of the carriage of the recreational vehicle.

8. The recreational vehicle monitoring device according to claim 5, wherein an indicator lamp is arranged on an upper surface of the transmitting main body to indicate a working status of the transmitting main body.

9. The recreational vehicle monitoring device according to claim 1, further comprising a camera holder, wherein a connecting end of the camera holder is configured to be connected to the rear portion of the carriage of the recreational vehicle; and the camera is rotatably connected to the camera holder to change a direction of the camera.

10. The recreational vehicle monitoring device according to claim 9, wherein the camera holder is further provided with a through hole, and the through hole is configured to allow the first cable to pass.

11. The recreational vehicle monitoring device according to claim 1, wherein a plurality of fill lights are arranged on a surface of the camera that is provided with a lens, and the fill lights surround the lens of the camera.

12. The recreational vehicle monitoring device according to claim 1, wherein the display device comprises a display screen main body and a receiving antenna, and the receiving antenna is rotatably connected to the display screen main body.

13. The recreational vehicle monitoring device according to claim 1, further comprising a display support, wherein the display support comprises a base and a support member; and one end of the support member is connected to the display device, and the other end of the support member is rotatably connected to the base.

* * * * *